C. B. HARDMAN.
HAY PRESS.
APPLICATION FILED AUG. 17, 1918.

1,324,962.

Patented Dec. 16, 1919.
2 SHEETS—SHEET 1.

Witness
H. S. McDowell

Inventor
C. B. Hardman
By C. C. Shepherd
Attorney

C. B. HARDMAN.
HAY PRESS.
APPLICATION FILED AUG. 17, 1918.
1,324,962.
Patented Dec. 16, 1919.
2 SHEETS—SHEET 2.
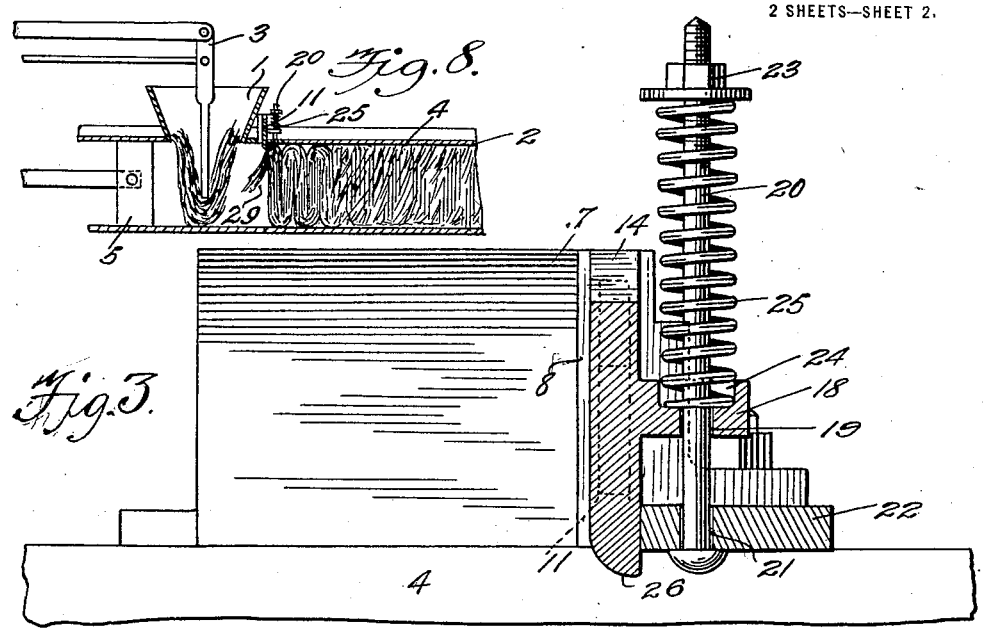
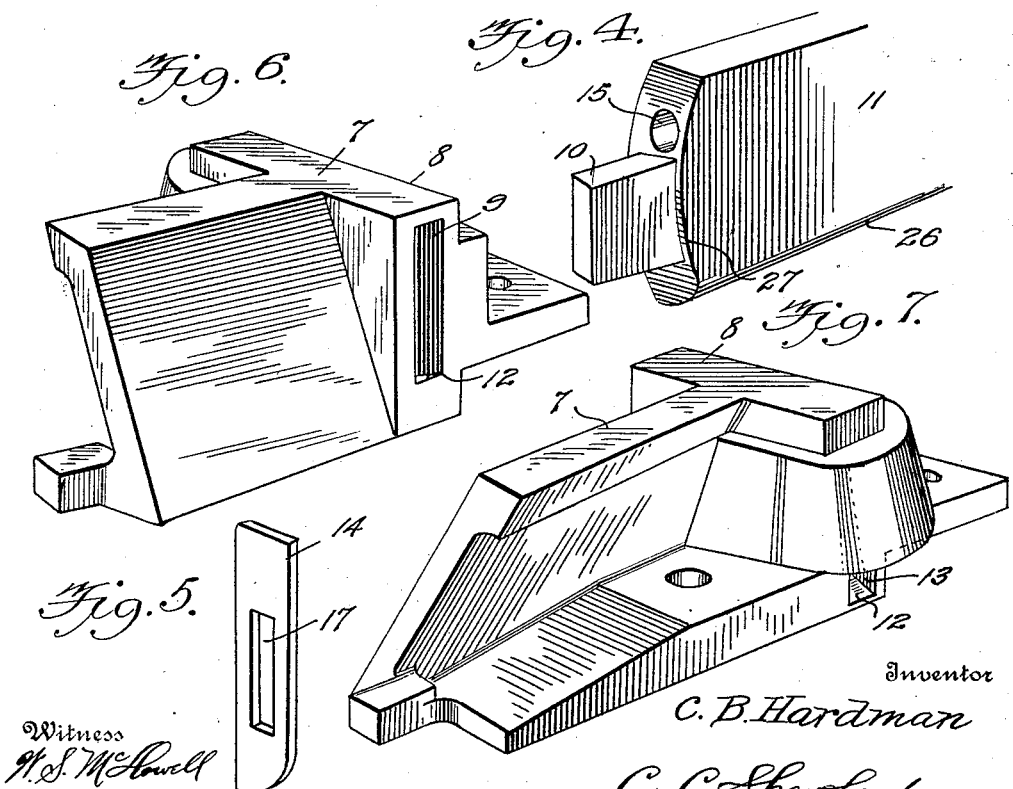
Witness
H. S. McHowell
Inventor
C. B. Hardman
By C. C. Shepherd
Attorney

UNITED STATES PATENT OFFICE.

CORNELIUS B. HARDMAN, OF COLUMBUS, OHIO.

HAY-PRESS.

1,324,962. Specification of Letters Patent. Patented Dec. 16, 1919.

Application filed August 17, 1918. Serial No. 250,292.

*To all whom it may concern:*

Be it known that I, CORNELIUS B. HARDMAN, a citizen of the United States, residing at Columbus, in the county of Franklin and State of Ohio, have invented certain new and useful Improvements in Hay-Presses, of which the following is a specification.

This invention relates to hay presses and, with regard to its more specific features, has particular reference to an improved folding tucker mechanism for use in connection with such presses.

The primary object of the invention is to provide, in connection with the baling chamber of a hay press, an improved and automatic folding tucker, which is so constructed as to positively fold or turn the overfeed down into the baling chamber, where it will be pressed into the bale by the next charging or compressing stroke of the press plunger, and by this operation to finally produce a completed bale characterized by its neat, smooth and square ended formation.

With these and other objects in view, as will appear as the description proceeds, the invention accordingly consists in the novel features of construction, combination of elements, and arrangement of parts hereinafter fully described and having the scope thereof defined by the appended claims.

Figure 1:
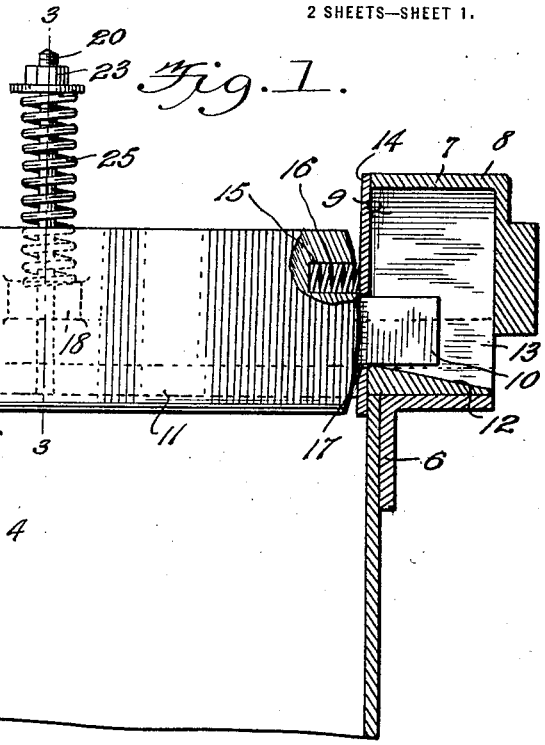
Figure 2:
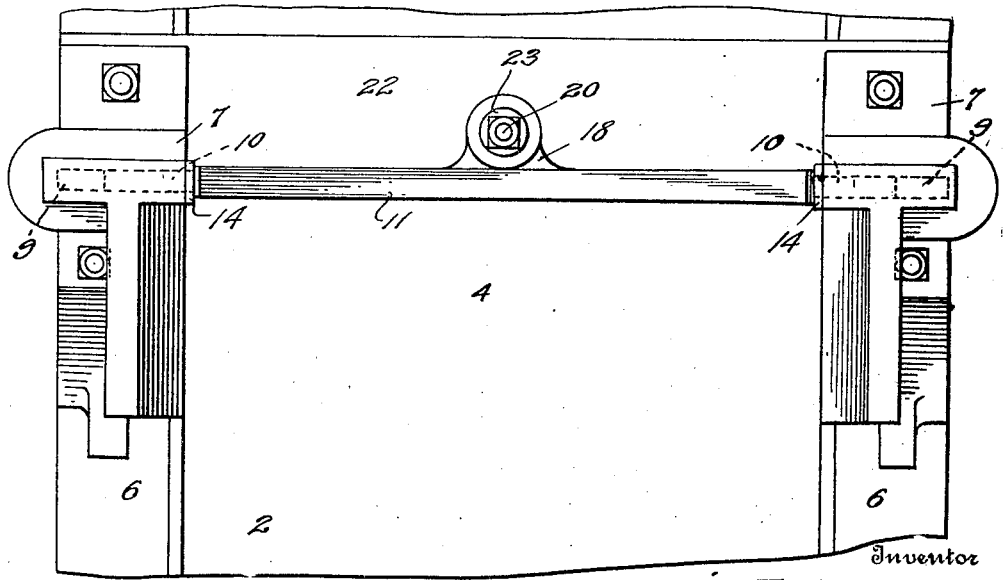

In the accompanying drawings, forming a part of this specification and in which similar characters of reference denote like and corresponding parts throughout the several views thereof:

Figure 1 is a vertical transverse sectional view taken through the baling chamber of a hay press, and illustrating the application of my improved tucker mechanism thereto, Fig. 2 is a top plan view of the structure shown in Fig. 1, Fig. 3 is a vertical longitudinal sectional view taken along the line 3—3 of Fig. 1, Fig. 4 is a detail perspective view of one end of the tucker frame, Fig. 5 is a perspective view of the face plate employed between the frame and bearing members, Fig. 6 is a perspective view of one of the bearing members, Fig. 7 is a similar view looking toward the other side of the bearing member, Fig. 8 is a diagrammatic longitudinal sectional view taken through a conventional form of hay press, and illustrating the location of the tucker mechanism with respect thereto.

In order that the aims and achievements of this invention may be clearly understood, it is thought advisable to state at this juncture that in the operation of hay presses or balers, hay or similar substances is forced in a loose state into the feed opening 1 of the press structure 2. This feature is usually accomplished by means of an oscillatory feeder arm 3, which is operated by suitable driving mechanism to successively force hay fed into the opening 1 into the baling chamber 4, after which the hay is forced rearwardly in the baling chamber by means of a reciprocatory plunger 5, and is compressed by engaging with the head of hay previously pressed into the baling chamber by previous operations of the plunger. The tying of the compressed hay and its removal from the press may then be accomplished in any suitable manner, and inasmuch as this feature does not enter into the present invention, a detailed explanation thereof will be accordingly omitted.

In thrusting the loose hay rearward into the compressing portion of the baling chamber, there is a tendency for the loose free ends thereof to protrude outwardly, and if steps were not taken to overcome this tendency, the completed bale would present an uneven, rough and unfinished appearance. That is, the loose ends of the hay would protrude or extend beyond the bale so that the same could not be closely packed or compressed and considerable waste might thus be involved.

It is therefore, the aim of the present invention, to provide improved tucker mechanism which will force these loose and protruding ends down upon the main body of hay situated in the baling chamber, where they will be so positioned that upon subsequent operations of the plunger, the same will be forced into the hay to form a closely packed completed bale, which latter being characterized by admirable smoothness and with a total absence of loose and protruding ends.

In the embodiment of the invention exemplified in the accompanying drawings, the baling chamber has its side walls formed along their upper edges with outwardly situated L shaped flanges 6, which carry, at a point adjacent to the feed opening 1, a plurality of opposed transversely situated bearing members 7. These members are preferably folded or otherwise firmly secured to the flanges 6 and are provided with enlarged heads 8, in which are formed elongated slots 9.

Mounted for vertical movement within the slots 9 are the reduced protruding ends 10 of the transversely extending frame member 11 of the tucker mechanism, this frame member being situated to extend across the baling chamber 3, at a point immediately to the rear of the feed opening 1, and is subject to limited vertical movement within the bearings. In order to prevent dust and other foreign matter from interfering with the vertical movements of the frame member, slots 9 are provided with inclined lower walls 12 which extend to a discharge opening 13 formed in each of the bearings, whereby in the event of dust collecting within the slots, the same will be gradually worked toward the openings 13 and eventually discharged from the bearings.

This results in complete and unrestricted movement on part of the frame member. To further prevent dust and such clogging matter from entering the bearings, there are provided a plurality of face plates 14, which are located between the ends of the frame member 11 and the inner faces of the bearing heads 8, so as to completely cover the slots 9. The plates are maintained in engagement with said inner faces by providing the frame member with openings 15, in which are situated a pair of coil springs 16, these springs being positioned to exert a sufficient amount of resilient force upon said face plates so that the latter will be maintained in close frictional relation with the inner faces of the heads 8, thus providing an additional means to prevent clogging matter from collecting within the slots 9. The face plates are further provided with slots 17, which are designed to receive the ends 10 of said frame member, whereby the face plates will move in unison with said frame member and will slide across the inner faces of the heads 8.

Located to the rear of the frame member at a point contiguous to the center portion thereof, as regards its length, is a lug 18, which in this instance is formed integral with said frame member. This lug is provided with a central opening 19, through which extends a vertically disposed stem 20, in the form of a bolt. The head portion of this stem passes through an opening 21 formed in a stationary bar 22 extending transversely across the baling chamber 4 and located immediately to the rear of the frame member, this bar being so positioned as to relieve the frame member of lateral stress.

The stem 20 passes loosely through the opening 19 in the lug 18, and has its upper end threaded for the reception of a nut or other stop projection 23, and adapted to engage with this nut and to be seated in a socket 24, formed in the lug 18, is a coil spring 25, which normally tends to force the frame member 11 downward to its greatest extent of movement, which latter being determined by the location of the bottom walls of the slots 9. By use of this construction it will be seen that the frame member is afforded resiliency solely through the single spring 25.

From the foregoing description, it will be seen that hay is forced into the baling chamber by the action of the plunger 5, and is compressed therein by usual procedure. The loose free ends of the hay, designated by the numeral 29, are prevented from bunching in said chamber by the action of the tucker mechanism described; which owing to its resilient mounting is forced upwardly by the rearwardly advancing plunger 5, the latter by contacting with the edge 26 of the frame 11 facilitates this upward movement. It will be evident that hay is thrust to the rear of the frame 11 so that when the plunger is retracted and freed from coöperation with the frame, the latter will be forced downwardly by the spring 25 and the hay thus locked by the perpendicular rear wall of the frame in a compressed condition within the baling chamber, and at a point to the rear of the feed opening, thus permitting a free and unhampered operation on part of the feeder arm 3. Again, owing to the downward movement of the frame 11, the loose ends 29 of the hay bunched to the rear of said frame, or forced downwardly in substantially the manner disclosed in Fig. 8, so that upon the next compressing movement of the plunger, these loose ends will be tucked into the body of the hay within the baling chamber and thus prevented from protruding beyond the edges of a completed bale. This construction provides a bale of desirable smoothness, combined with neat, firmly compressed and square ended formation.

The ends of the frame member are also curved as indicated by the numeral 27, this construction permits the frame member to rock vertically, and compensates for inequalities in amount of material upon different sides of the baling chamber, thus rendering the action of the frame member substantially uniform over the entire width of the baling chamber. It will thus be manifest that there is provided tucker mechanism of strong, substantial, simple and reliable construction, capable of forming smooth and firmly compressed bales, and one wherein the parts are not liable to readily become out of order. The frame member is substantially braced to withstand all normal operative pressures and its action is rendered positive and reliable by the location of the spring 25, which is so positioned as to be free from all stresses and strains imparted to the frame member by the action of the plunger 5. Furthermore, owing to the manner of constructing bearing members, dust or other foreign matter will be positively excluded from the slots 9, thus insuring full stroke movements on part of the frame member. As shown in the drawings, these bearing members are provided with integral inclined sides, with which the walls of the feed opening 1 are associated. The rocking movement afforded by the curved side edges 27 is another desirable feature of this invention, in that they insure proper elevation of the frame member and effectively prevent the latter from wedging in position. In view of the foregoing it is thought that the advantages, construction and operation of the present invention will be clearly understood, and therefore a more extended explanation will be accordingly omitted.

I claim:

1. In a hay press, a folding tucker carried by said press and comprising a frame situated to extend transversely of the bale chamber of the press, wings protruding from the ends of said frame, bearings stationarily mounted upon said press and formed with vertically extending slots for the reception of said wings, said slots being of a substantially greater height than said wings to permit of vertical movement on part of said frame, and spring means coöperative with the central portion of said frame and normally tending to force the latter downwardly.

2. In a hay press, a folding tucker carried by said press and comprising a vertically movable frame situated to extend transversely of the baling chamber of said press, stationary bearings located contiguous to the upper edges of said chamber for supporting said frame and permitting of limited vertical movement on part of the latter, a projection formed by said frame and extending rearwardly from approximately the central portion thereof, a vertically positioned stem, and a coil spring mounted between a relatively fixed device carried by said stem and said projection and normally tending to force said frame downwardly.

3. In a hay press, folding tucker mechanism coöperative with the baling chamber of said press, comprising a vertical movable frame member, reduced extremities protruding from the edges of said member, slotted bearings carried by said press for the reception of said frame extremities, spring pressed face plates interposed between the edges of said frame and said bearings and provided with slots for the reception of said frame extremities, and spring means coöperative with each of said frames and normally tending to force the latter downwardly.

4. In a hay press, folding tucker mechanism coöperative with the baling chamber of said press, comprising a vertical movable frame member, reduced extremities protruding from the edges of said member, slotted bearings carried by said press for the reception of said frame extremities, spring pressed face plates interposed between the edges of said frame and said bearings and provided with slots for the reception of said frame extremities, spring means coöperative with each of said frames and normally tending to force the latter downwardly, and curved edges provided upon the ends of said frame to permit of vertical rocking movement on part of the latter.

In testimony whereof I affix my signature.

CORNELIUS B. HARDMAN.